United States Patent [19]

Iniotakis et al.

[11] Patent Number: 4,699,637
[45] Date of Patent: Oct. 13, 1987

[54] HYDROGEN PERMEATION MEMBRANE

[75] Inventors: Nicolas Iniotakis, Jülich; Claus-Benedict von der Decken, Aachen; Heinrich Fedders, Jülich; Werner Fröhling, Düren; Friedrich Sernetz, Alzenau-Kälberau, all of Fed. Rep. of Germany

[73] Assignee: Kernforschungsanlage Jülich Gesellschaft mit beschränkter Haftung, Jülich, Fed. Rep. of Germany

[21] Appl. No.: 649,043

[22] Filed: Sep. 10, 1984

[30] Foreign Application Priority Data

Sep. 8, 1983 [DE] Fed. Rep. of Germany ....... 3332348

[51] Int. Cl.$^4$ ............................................. B01D 53/22
[52] U.S. Cl. ........................................ 55/158; 55/16; 55/521; 55/524; 55/525
[58] Field of Search ................... 55/16, 158, 521, 524, 55/525

[56] References Cited

U.S. PATENT DOCUMENTS

| | | | |
|---|---|---|---|
| 1,871,226 | 8/1932 | Skala | 55/16 X |
| 2,824,620 | 2/1958 | De Rosset | |
| 2,958,391 | 11/1960 | deRosset | 55/16 |
| 3,238,703 | 3/1966 | Straschil et al. | 55/158 |
| 3,238,704 | 3/1966 | Straschil et al. | 55/158 |
| 3,241,298 | 3/1966 | Pierce | |
| 3,247,648 | 4/1966 | McKinley | 55/16 |
| 3,350,846 | 11/1967 | Makrides et al. | 55/16 |
| 3,422,679 | 1/1969 | McGowan et al. | 55/486 X |
| 3,447,288 | 6/1969 | Juda et al. | 55/158 |
| 3,469,372 | 9/1969 | Yamauchi et al. | 55/158 |
| 3,486,301 | 12/1969 | Bonnet | 55/158 |
| 3,534,531 | 10/1970 | Equchi et al. | 55/158 |

FOREIGN PATENT DOCUMENTS

| | | |
|---|---|---|
| 1467079 | 1/1969 | Fed. Rep. of Germany . |
| 2629719 | 1/1978 | Fed. Rep. of Germany . |
| 3121125 | 2/1983 | Fed. Rep. of Germany . |
| 3125222 | 3/1983 | Fed. Rep. of Germany ........ 55/158 |
| 966122 | 8/1964 | United Kingdom ................... 55/16 |
| 969673 | 9/1964 | United Kingdom ................... 55/16 |
| 972166 | 10/1964 | United Kingdom ................... 55/16 |
| 1325426 | 8/1973 | United Kingdom ................... 55/16 |

Primary Examiner—Robert Spitzer
Attorney, Agent, or Firm—Nils H. Ljungman

[57] ABSTRACT

A hydrogen permeation membrane in the form of a metal coating such as palladium and alloys of palladium less than 100 microns in thickness supported by a fabric with a mesh width not exceeding 50 microns. A diffusion blocking material such as nickel and alloys of nickel may be provided. The metal coating may be in the range of about 10 to 30 microns, and the mesh width may be in the range of about 2 to 20 microns.

14 Claims, 3 Drawing Figures

HYDROGEN PERMEATION MEMBRANE

BACKGROUND OF THE INVENTION

1. Field of the Invention

The invention relates to a hydrogen permeation membrane in the form of a selective hydrogen-permeable metal coating less than 100 microns thick, specifically 10 microns to 30 microns thick, consisting of a material with a high hydrogen permeation coefficient, specifically on the basis of palladium, with an adjacent gas-permeable support structure.

2. Description of the Prior Art

The high permeability of hydrogen through suitable membranes is used in many ways in industry. The membranes thereby act as a separating wall between two spaces, but one which is hydrogen permeable to the greatest possible extent is very desirable.

The first example which can be cited is the removal of impurities from hydrogen gas: the hydrogen current to be decontaminated is trained along a separating wall consisting of Pd or Pd-Ag. By permeation, high-purity hydrogen is recovered on the secondary side, while the impurities remain on the primary side. For a high hydrogen-permeation flow-in addition to other operating and material parameters-the wall thickness of the separating membrane must be as low as possible.

Another example is the optionally selective or nonselective separation described in DE-OS No. 3 121 125 of certain isotopes of hydrogen, e.g. tritium, from a mixture of isotopes of hydrogen: the hydrogen isotopes permeate a separating membrane, interact with a substance present on the secondary side, and are removed with this latter substance. The choice of the substance makes it possible to either remove all the hydrogen isotopes or to selectively remove only a given isotope, e.g. tritium.

The separating walls which are used in the processes described above and in similar processes must have a high permeability for hydrogen. Materials which fall into this category include metallic substances such as Nb, Ta, V, Pd and Zr, but also certain glasses and plastics. The prevailing ambient conditions, however, can lead to significant limitations. These limitations, for the metallic substances, include embrittlement from the formation of hydrides and the severe reduction of the hydrogen permeation coefficients as a result of the formation of blocking cover coatings on the surface of the membrane, e.g. in the form of metal oxides. For this reason, preference is given to the use of palladium and its alloys, which are largely resistant both to the formation of hydrides and also to surface oxidation. But with palladium, the principal disadvantages are its high price and its limited availability. For this reason, membranes which are as thin as possible are desirable. On account of the required mechanical stability, the lower limit of the feasible wall thicknesses for thin-walled tubes is about 70 microns, even if reinforcement elements are provided inside, as spiral springs (DE-PS No. 1 467 079).

To further decrease the wall thickness for the Pd, porous carriers have been suggested, e.g. made of sintered metal, on which a thin Pd coating of up to 12 microns thick is applied, e.g. by vaporization (U.S. Pat. Nos. 2,824,620 and 3,241,298). But with porous carriers which are made of granular material such as metal particles, one disadvantage is their required wall thickness of approximately 500 microns to 1000 microns for the desired strength. This leads to a significant reduction of the effective permeation velocity through the overall separation wall.

While the effective permeation velocity of the hydrogen through a free-standing Pd tube is determined only by the permeation step through the metal, with the combination of a porous carrier 500 microns thick and a Pd coating 5 microns thick, the diffusion velocity in the porous carrier becomes the dominant factor for the effective permeation velocity.

Since the permeation surface required for the achievement of a given permeation flow, and thus the Pd requirement, is determined by these factors, the advantage of the low thickness of the Pd coating can be utilized only very incompletely.

SUMMARY OF THE INVENTION

The problem addressed by the invention is therefore the creation of a hydrogen permeation membrane, which simultaneously possesses sufficient stability and the highest possible permeability for hydrogen.

This problem is solved by a permeation membrane of the type described above, which is characterized by the fact that the support structure is formed by a bilateral support of the metal coating by, on each side, an adjacent fine-mesh metal cloth or fabric with a mesh width of a maximum of 50 microns, specifically 2 to 20 microns.

According to the invention, two fine-mesh fabrics enclose a thin-walled foil or coating of Pd or a Pd alloy (or another hydrogen-permeable material), whereby the foil or coating is both held in place and protected. The selective hydrogen-permeable metals which can be considered are specifically Nb, Ta, V, Pd and Zr, but preferably Pd and Pd alloys.

To absorb the forces which are caused by the pressure and flow of the fluids striking the membrane, and to hold the foil in place in the case of large surface areas, the membrane can be configured in the manner of an accordion-fold.

A combination of thin-walled membranes for osmosis, dialysis and similar processes with a support structure of fine-mesh metal fabric is, of course, already known from DE-OS No. 26 29 719. There, however, only a unilateral support is recommended. Thus, for example, a membrane in the form of a hose is inserted in a support tube made of metal fabric. With very thin metal foils, e.g. with a wall thickness of 10 microns, however, the assembly of larger tube surfaces using the process suggested by this DE-OS is no longer possible, owing to the mechanical sensitivity of such foils. Added to this is the fact that such thin metal foils, in and of themselves, are very difficult to weld or solder satisfactorily, which makes the manufacture of hose-shaped membranes problematic.

The membrane described by the invention, supported on both sides, can, on the other hand, be manufactured and worked quite simply.

BRIEF DESCRIPTION OF THE DRAWINGS

The accompanying drawings illustrate a present preferred embodiment of the invention in which.

DESCRIPTION OF THE PREFERRED EMBODIMENTS

Between two fine-mesh metal fabrics 1 and 2 with a mesh width of, for example, 5 to 50 microns, which does not significantly hinder the transport of gas to the foil, a foil 3 of a Pd-Ag (75/25) alloy is placed, which has a wall thickness of approximately 10 microns. The mesh width is determined by the fact that a "sagging" of the foil must be prevented when it is exposed to the prevailing pressure.

Foils of the type described above can be manufactured in widths up to 200 mm, e.g. by rolling, whereby lengths up to 1 m or even more are possible. If the permeation membrane is to be more than 200 mm wide, then several strips of foil can be placed side-by-side with a slight overlap of approximately 5 mm.

Figure 1:
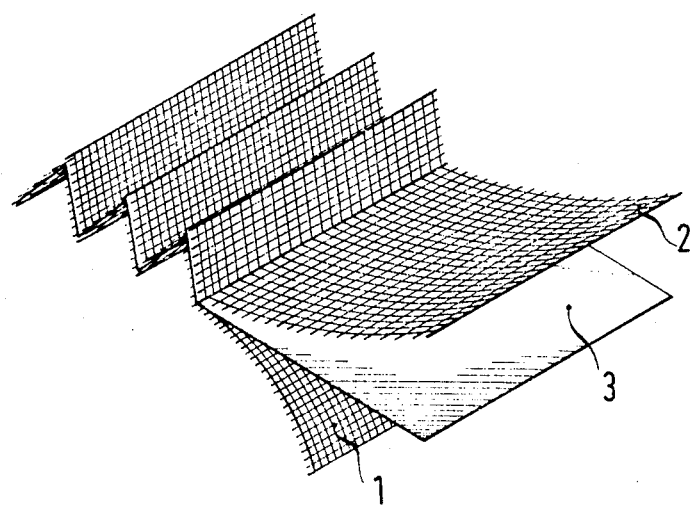
FIG. 1 is a schematic drawing of a permeation membrane made in accordance with the invention.

The permeation membrane consisting of three layers is now folded accordion-fashion by means of a folding apparatus, as indicated in FIG. 1. The metal fabrics 1 and 2 enclosing the foil 3 are, for the sake of clarity, shown in partly raised section. The folding height can be selected on the basis of stability and flow criteria, and can, for example be between 3 and 10 mm.

Figure 2:
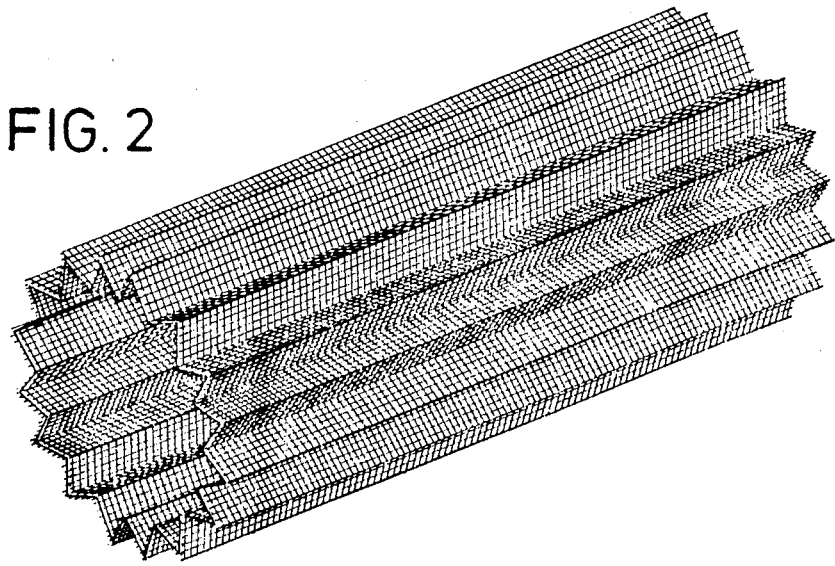
FIG. 2 is a schematic drawing of the membrane of FIG. 1 disposed in a tubular configuration with accordion-fold walls.

As shown in FIG. 2, a tubular filter cartridge can be formed from the folded permeation membrane. The longitudinal seam can be formed by welding or soldering, whereby the total of four adjacent metal fabrics contribute sufficient structural material for the joining process. The tubular filter cartridge formed in this manner can then be shaped according to known methods, for example into fittings.

If a high flow velocity is desired on the inside, then the accordion fold can be placed, as shown in FIG. 2, directly around a tube, which acts as a positive displacement body.

If no positive displacement tube is desired, the mechanical stability of the filter cartridge can be increased, if necessary, by placing the accordion fold, as shown in FIG. 2, around a support tube made of wires. Such tubes consist, for example, of angular arranged rods, which are connected with one another by welded windings. The support tube also has the property that, in the case of a current in the adjacent area, turbulence occurs, and the material transport and material exchange directly on the membrane are thereby encouraged. The hydrogen permeation is thereby improved.

The permeation membrane formed by folding, in addition to the above-mentioned property of holding the sensitive Pd film in place, offers other advantages:
- a greater amount of permeation surface than smooth tube walls, i.e. the design of the filter installation can be more compact;
- on account of the good rigidity of the folded tube wall, depending on the loads, other mechanical supports may be omitted, i.e. the folded membrane can be located unsupported between two end structures, even in a plane geometry.

Of course, an unfolded configuration is also possible. In this case, the permeation membrane consisting of two metal fabrics with foil in between, is especially supported by a framework, e.g. laid around a support tube as described above, and the longitudinal seam is welded or soldered.

Figure 3:
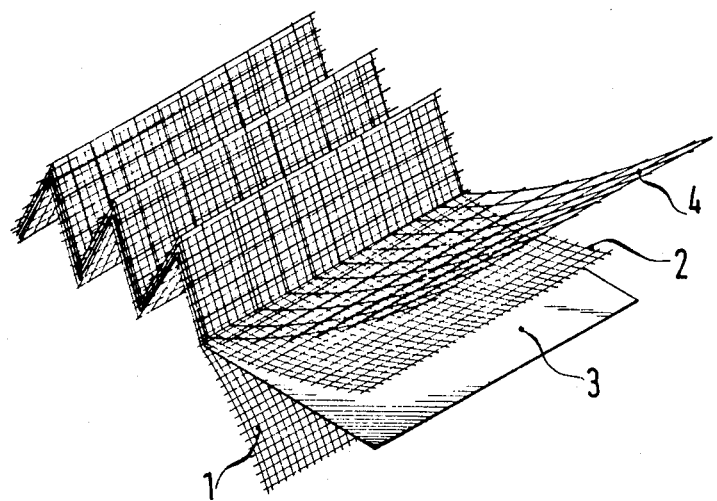
FIG. 3 is a schematic representation of the membrane of FIG. 1 with an additional support frame or protective mesh positioned on the outside of the metal fabric.

Both for the folded and the unfolded configuration, an additional reinforcement can be provided, e.g. to absorb great differences in pressure, by placing an additional support frame or coarse mesh fabric on the outside of one or both metal fabrics. An example is illustrated schematically in FIG. 3, which shows how in addition to the metal fabrics 1 and 2 a coarse metal cloth 4 can be added.

The bilateral enclosure of the foils by metal fabric, in addition to holding the foil in place, is designed to protect the foil. Even a current which has been properly cleaned of dusts will still contain dust particles smaller than 1 micron, which can cover the foil and passivate it. The metal fabric outside the foil now serves as a dust filter for these fine dusts, since the gas current laden with fine dust runs parallel and not perpendicular to the surface of the metal fabric.

When the present permeation membrane is used as a selective tritium filter in the process described by DE-OS No. 3 121 125, according to which, for example, tritium is removed from a reactor cooling circuit operated with helium by a hydrogen-permeable membrane and reaction behind the membrane with a material which absorbs hydrogen, the use of the invention provides some additional important advantages:

The foil is protected by the metal fabric on both sides from passivating fission product, such as iodine, which are mixed in with the primary gas. The iodine will, with a high probability, come into contact with the surface of the metal fabric before it reaches the foil, and will be absorbed there. That means that the foil will remain free, at least initially, of such effects.

To increase the permeation flow, hydrogen permeation membranes are usually used at high temperatures, which can, for example, go as high as 600° C. In such temperature ranges, there already exists a significant danger of the interdiffusion of metal between surfaces in contact with one another, i.e. a palladium foil would, for example, be weakened by the migration of palladium into an absorbent metal fabric at the contact points. To prevent this, the fabric surface, specifically in the area adjacent to the metal coating, can be provided with a diffusion-blocking coating (e.g. nickel or, especially, the foil material itself). Coating thicknesses of only a few microns would be useful to increase the stability of the permeation membrane in the range of higher temperatures by means of such diffusion-blocking layer.

In general, but especially at high temperatures, fabrics of heat-resistant material such as, for example, weavable nickel-base alloys, are used. Since the gases which are brought into contact with the metal fabric during operation (especially the hot gases) can contain corrosive components, it is appropriate to provide the metal fabric with a corrosion-resistant metal coating (e.g. of a noble metal or a noble metal alloy). Preferably, the coating which is provided is also the one which is necessary for the isotope exchange reaction, so that in the case of a selective separation of hydrogen isotopes (e.g. in accordance with DE-OS No. 3 121 125), an acceleration of the exchange reaction is achieved.

Basically, the direction of permeation can be selected at will. The decisive factor for the selection of the direction of permeation can, for example, be the effect of the turbulence produced by a support frame, if any.

In addition to a support structure of fine-mesh metal fabric, a support structure which consists of a perforated metal sheet can also be used. Holes with a diameter of, for example, 50 microns or less can be burnt by means of electron or laser beams. Such a perforated sheet can, with a suitable configuration of the holes, also have a high gas-permeability and therefore (e.g. similar to the densest sphere or circle packing) can also serve as a support structure. Such an arrangement, which can still be considered a network, of course has a higher amount of surface in contact with the membrane than the metal fabric, which can be a disadvantage for the gas-permeability of the membrane, but the much more economical manufacturing procedures may compensate for this disadvantage.

While the foregoing describes and illustrates certain present preferred embodiments of the invention, it is to be understood that the invention is not limited thereto and that the invention may be otherwise variously practiced within the scope of the following claims.

We claim:

1. Hydrogen permeation apparatus comprising a membrane in the form of a hydrogen permeable metallic foil of not more than 100 microns in thickness, and first and second support means for the membrane disposed on either side of and in contact with the membrane, each said support means comprising a metal cloth having a mesh width of not more than 50 microns, said membrane being arranged between said first and second support means whereby the said foil does not sag, in use, within the mesh openings.

2. Hydrogen permeation apparatus in accordance with claim 1 in which the metallic foil is from about 10 microns to about 30 microns in thickness.

3. Hydrogen permeation apparatus according to claim 2 in which the mesh width of the metal cloth is from about 2 microns to about 20 microns in width.

4. Hydrogen permeation apparatus according to claim 3 in which the metallic foil is selected from the group consisting of palladium and alloys of palladium.

5. Hydrogen permeation apparatus according to claim 4 in which said first and second support means and said membrane are together folded into accordion-fold type corrugations.

6. Hydrogen permeation apparatus according to claim 5 in which said first and second support means and said membrane are in the shape of a tube, the inside of which is substantially occupied by a tubular displacement body.

7. Hydrogen permeation apparatus according to claim 4 in which support means and said first and second said membrane are in the shape of a tube.

8. Hydrogen permeation apparatus according to claim 3 in which at least the surface of the metal cloth includes a corrosion resistant material.

9. Hydrogen permeation apparatus according to claim 8 in which the corrosion resistant material is selected from the group consisting of nickel and alloys of nickel.

10. Hydrogen permeation apparatus according to claim 8 in which the corrosion resistant material is a coating selected from the group consisting of noble metals and alloys of noble metals.

11. Hydrogen permeation apparatus according to claim 1 in which said metal cloth includes a diffusion blocking coating deposited thereon.

12. Hydrogen permeation apparatus according to claim 11 in which the diffusion blocking coating is selected from the group consisting of nickel and alloys of nickel.

13. Hydrogen permeation apparatus comprising a membrane in the form of a hydrogen permeable membrane of not more than 100 microns thickness, and support means for the membrane disposed on either side thereof and in contact therewith, said support means comprising metallic fabric having a mesh width of not more than 50 microns, said metallic fabric having a diffusion-blocking metallic layer thereon for increasing stability of said permeable membrane at relatively high operating temperatures.

14. The hydrogen permeation apparatus as in claim 13 wherein said diffusion-blocking metallic layer comprises nickel-based material deposited to form a layer with a thickness in the range of 10 to 30 microns.

* * * * *